E. H. SHERBONDY.
SUPERCHARGING DEVICE FOR TURBO COMPRESSORS.
APPLICATION FILED MAY 14, 1918.
1,310,683.
Patented July 22, 1919.
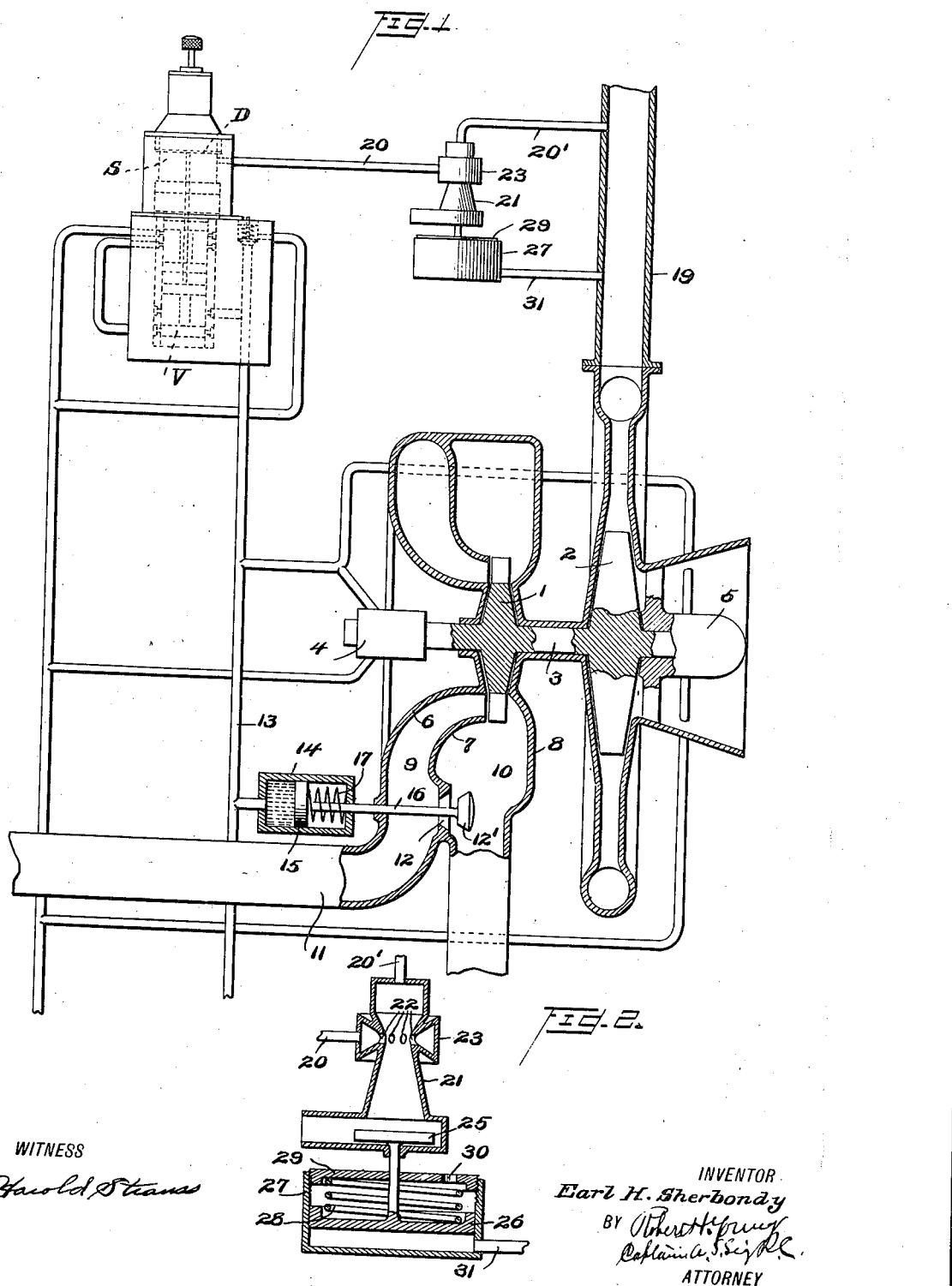
WITNESS
Harold Strauss
INVENTOR
Earl H. Sherbondy
BY
ATTORNEY

UNITED STATES PATENT OFFICE.

EARL H. SHERBONDY, OF CLEVELAND, OHIO.

SUPERCHARGING DEVICE FOR TURBO-COMPRESSORS.

1,310,683. Specification of Letters Patent. Patented July 22, 1919.

Application filed May 14, 1918. Serial No. 234,556.

*To all whom it may concern:*

Be it known that I, EARL H. SHERBONDY, a citizen of the United States, residing at Cleveland, in the county of Cuyahoga and State of Ohio, have invented certain new and useful Improvements in Supercharging Devices for Turbo-Compressors, of which the following is a specification.

This invention relates to an automatic control means for a turbo-compressor.

The turbo-compressor in question is designed to be operated by the waste gases from an internal combustion engine, more particularly from an airplane engine, and the compressor unit of the turbo-compressor is intended to supply a constant amount of air to the carbureter of the engine, regardless of the height at which the airplane may be.

More particularly the invention comprises an automatic controlling means for this turbo-compressor, one designed to cause the compressor unit to deliver an excess of air at lower altitudes, that is to say, to supercharge, and at higher altitudes to maintain the normal, substantially constant air supply.

Another feature of the invention is to provide a means to limit the amount of this supercharging action, that is to say, a kind of safety valve, to prevent the supercharging from going so far that too much air would be delivered to the carbureter of the engine.

The general arrangement is quite similar to that shown in my copending case Serial No. 227333, filed April 8, 1918.

Other objects and advantages will appear as the description proceeds.

In the drawings, which are diagrammatic, Figure 1 shows the turbo-compressor unit and controlling system therefor, and Fig. 2 is a section on an enlarged scale of the particular feature of this invention.

The turbo-compressor unit comprises the turbine wheel 1, and compressor wheel 2, turning with a common shaft 3, mounted in suitable bearings 4 and 5.

Associated with the turbine wheel 1 are casing elements 6, 7 and 8, the elements 6 and 7 defining between them an inlet chamber 9, into which are led the exhaust gases from the airplane engine, and the elements 7 and 8 defining between them the exhaust chamber 10, from which the gases escape to the atmosphere. The exhaust gases enter the chamber 9 through the pipe 11, they passing from the chamber 9 through the buckets of the turbine, and thence into the exhaust chamber 10.

The casing element 7 is provided with a suitable valve seat 12, in which is positioned a by-pass valve 12', which valve, it will be evident, will by-pass the gases from the chamber 9 directly to the chamber 10, without passing through the turbine buckets.

The valve 12' is controlled by variations in the oil pressure in an oil pressure pipe 13, the said oil pressure being communicated to the cylinder 14, in which moves a piston 15 that is directly connected to the stem 16 of the valve 12'. A spring 17 is positioned in the cylinder 14 on the side of the piston opposite to that side subject to the oil pressure. It will be evident, that variations in the oil pressure cause movement of the valve 12', to speed up or slow down the turbine, and consequently to cause the compressor wheel 2 to vary the pressure.

As described in detail in my co-pending case Serial No. 224,894, filed March 26, 1918, the oil pressure in the line 13 is controlled by a valve V, which valve in turn is controlled by a diaphragm D, which is responsive to the delivery pressure of the compressor through a pipe 20, which is connected to the delivery pipe 19 of the compressor, and opening at its other end into the space S below the diaphragm D. Above the diaphragm D is confined a body of air at substantially atmospheric pressure. It will be evident, that as the oil pressure in the line 13 is varied, more or less gas will be by-passed through the valve 12', to slow down or speed up the air compressor.

It is apparent, that if the pressure in the space S is artificially lowered, that the diaphragm D will operate valve V so as to speed up the compressor. This may be accomplished by interpolating in the pipe 20 a Venturi tube 21, the throat of which is provided with a series of holes 22, which communicate with an annular collar 23, which in turn opens into the pipe 20 that leads to the space S. A pipe 20' is connected to the delivery pipe 19.

The mouth of the venturi is controlled by valve 25, which in turn is controlled by a piston 26 moving in cylinder 27. Above the piston 26 there is positioned a spring 28, which is held in place, and which may be adjusted by, the screw threaded cap 29. The cap 29 is provided with a hole 30, so that the upper part of the piston will be responsive to variations in the atmospheric pressure, as well as responsive to the spring pressure 28. The lower side of the piston 26 is responsive to the delivery pressure from the compressor by means of a pipe 31, opening into the cylinder 27 below the piston 26, and opening at its opposite end into the pipe 19.

The operation of the device is as follows:—At sea level the upper side of the piston 26 is subject to the atmospheric pressure in addition to the spring pressure 28 and the valve 25 is lowered, allowing the mouth of the venturi to be open. Air from the pipe 20' accordingly escapes through the mouth of the venturi, which will, by the well known venturi action, reduce the pressure in the collar 23, in the pipe 20 and in the space S, which artificial lowering of the pressure in the space S will cause the diaphragm D and valve V to be actuated as if the airplane were at a relatively high altitude, and so would cause the compressor to speed up and deliver more pressure. This just described supercharging action at low altitudes may be useful in starting the airplane from rough water or rough land, or in escaping from or pursuing a hostile machine.

Too much air, however, is obviously not desirable for proper combustion in the engine. In order, therefore, to limit the supercharging action, the pipe 31 will lead and subject the piston 26 to this excess pressure so as to raise the piston and close the mouth of the venturi with the valve 25, thus shutting it out of action entirely or partially, according to how tightly it is closed. As in my co-pending case Serial No. 227,333, filed April 8, 1918, it may be noted that the supercharging action will be dispensed with at higher altitudes, due to the fact that the pressure above the piston 26 will become lower and lower as the airplane rises, since the upper part of the piston is responsive to the atmospheric pressure through the hole 30. Adjustment of the cap 29 will vary the compression on the spring 28, so that the time at which the supercharging action is cut out may be suitably regulated.

It should be understood that the invention is not necessarily limited to the exact disclosure, but may be carried out in other ways, as defined within the scope of the appended claims.

I claim:

1. In combination, an air compressor, means to control the delivery pressure of the compressor, means to cause the compressor to supercharge at lower altitudes and means to limit the amount of supercharge.

2. In combination, an air compressor, means to control the delivery pressure thereof so that a normal substantially constant pressure is maintained, means to cause the compressor to supercharge at lower altitudes and means to limit the amount of supercharge.

3. In combination, an air compressor, means responsive to the delivery pressure thereof to control the delivery pressure of said compressor, and means responsive to the atmospheric pressure, to cause the compressor to supercharge, said last mentioned means being also responsive to the delivery pressure of said compressor to limit the supercharging action.

4. In combination, an air compressor, means to control the delivery pressure thereof so that a normal substantially constant pressure is maintained and means responsive to the atmospheric pressure to influence said controlling means to cause said compressor to supercharge at lower altitudes and to maintain the normal pressure at higher altitudes, said last mentioned means being also responsive to the delivery pressure of the compressor to limit the amount of the supercharging action.

5. In combination, an air compressor, means responsive to the delivery pressure of said compressor to control the compressor pressure, means responsive on one side to the atmospheric pressure, and on the other side to the delivery pressure of said compressor, to cause the compressor to supercharge at low altitudes, said means also acting to limit the amount of the supercharging action.

In testimony whereof I affix my signature.

EARL H. SHERBONDY.